(12) United States Patent
Nagano

(10) Patent No.: US 11,652,438 B2
(45) Date of Patent: May 16, 2023

(54) MAGNET TEMPERATURE ESTIMATION DEVICE

(71) Applicant: TOYOTA JIDOSHA KABUSHIKI KAISHA, Toyota (JP)

(72) Inventor: Tomoya Nagano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/684,899

(22) Filed: Mar. 2, 2022

(65) Prior Publication Data

US 2022/0345071 A1   Oct. 27, 2022

(30) Foreign Application Priority Data

Apr. 26, 2021   (JP) ................................ 2021-073977

(51) Int. Cl.
*H02P 29/66*   (2016.01)
*H02P 23/00*   (2016.01)
*G01K 13/08*   (2006.01)

(52) U.S. Cl.
CPC ............ *H02P 29/662* (2016.11); *G01K 13/08* (2013.01); *H02P 23/0018* (2013.01); *H02P 2207/05* (2013.01)

(58) Field of Classification Search
CPC .............. H02P 29/662; H02P 23/0018; H02P 2207/05; G01K 13/08
See application file for complete search history.

(56) References Cited

U.S. PATENT DOCUMENTS

| 2009/0082174 | A1* | 3/2009 | Ikeda ...................... F16H 59/72 477/98 |
| 2014/0126606 | A1 | 5/2014 | Ito et al. |
| 2015/0369307 | A1* | 12/2015 | Yoshino ................. B60K 23/08 701/67 |
| 2020/0389072 | A1* | 12/2020 | Engström .............. H02K 11/25 |

FOREIGN PATENT DOCUMENTS

| JP | 2014-093867 A | 5/2014 |
| JP | 2021-027626 A | 2/2021 |

\* cited by examiner

*Primary Examiner* — Zoheb S Imtiaz
(74) *Attorney, Agent, or Firm* — Sughrue Mion, PLLC

(57) ABSTRACT

Parameters relating to rotation of a motor (2) measured every constant time are acquired and the moving average of each constant interval of the parameters is calculated. The calculated moving averages are input to a training model trained so as to output a temperature of magnets attached to a rotor (7) of the motor (2) when the moving averages of the parameters relating to rotation of the motor (2) are input, and an estimated value of the magnet temperature output from the model is acquired. Next, the acquired estimated value of the magnet temperature is output.

5 Claims, 18 Drawing Sheets

FIG. 4A

| $wa_{(2)1}$ | $wa_{(2)2}$ | $wa_{(2)3}$ | $wa_{(2)4}$ |
|---|---|---|---|
| $wb_{(2)1}$ | $wb_{(2)2}$ | $wb_{(2)3}$ | $wb_{(2)4}$ |
| $wc_{(2)1}$ | $wc_{(2)2}$ | $wc_{(2)3}$ | $wc_{(2)4}$ |
| $wd_{(2)1}$ | $wd_{(2)2}$ | $wd_{(2)3}$ | $wd_{(2)4}$ |

⋮

| $wa_{(20)1}$ | $wa_{(20)2}$ | $wa_{(20)3}$ | $wa_{(20)4}$ |
|---|---|---|---|
| $wb_{(20)1}$ | $wb_{(20)2}$ | $wb_{(20)3}$ | $wb_{(20)4}$ |
| $wc_{(20)1}$ | $wc_{(20)2}$ | $wc_{(20)3}$ | $wc_{(20)4}$ |
| $wd_{(20)1}$ | $wd_{(20)2}$ | $wd_{(20)3}$ | $wd_{(20)4}$ |

FIG. 4B

| $z_{(2)t-6}$ | $z_{(2)t-5}$ | $z_{(2)t-4}$ | $z_{(2)t-3}$ | $z_{(2)t-2}$ | $z_{(2)t-1}$ | $z_{(2)t}$ |
|---|---|---|---|---|---|---|

⋮

| $z_{(20)t-6}$ | $z_{(20)t-5}$ | $z_{(20)t-4}$ | $z_{(20)t-3}$ | $z_{(20)t-2}$ | $z_{(20)t-1}$ | $z_{(20)t}$ |
|---|---|---|---|---|---|---|

FIG. 6

| TIME | t-9 · · · · · · · · · · · · · · · t |
|---|---|
| INPUT VALUE | · · · $a_{t-9}$ $a_{t-8}$ $a_{t-7}$ $a_{t-6}$ $a_{t-5}$ $a_{t-4}$ $a_{t-3}$ $a_{t-2}$ $a_{t-1}$ $a_t$ |
| | · · · $b_{t-9}$ $b_{t-8}$ $b_{t-7}$ $b_{t-6}$ $b_{t-5}$ $b_{t-4}$ $b_{t-3}$ $b_{t-2}$ $b_{t-1}$ $b_t$ |
| | · · · $c_{t-9}$ $c_{t-8}$ $c_{t-7}$ $c_{t-6}$ $c_{t-5}$ $c_{t-4}$ $c_{t-3}$ $c_{t-2}$ $c_{t-1}$ $c_t$ |
| | · · · $d_{t-9}$ $d_{t-8}$ $d_{t-7}$ $d_{t-6}$ $d_{t-5}$ $d_{t-4}$ $d_{t-3}$ $d_{t-2}$ $d_{t-1}$ $d_t$ |

| TIME | t-5 · · · · · · · t |
|---|---|
| INPUT VALUE | $ma_{t-5}$ $ma_{t-4}$ $ma_{t-3}$ $ma_{t-2}$ $ma_{t-1}$ $ma_t$ |
| | $mb_{t-5}$ $mb_{t-4}$ $mb_{t-3}$ $mb_{t-2}$ $mb_{t-1}$ $mb_t$ |
| | $mc_{t-5}$ $mc_{t-4}$ $mc_{t-3}$ $mc_{t-2}$ $mc_{t-1}$ $mc_t$ |
| | $md_{t-5}$ $md_{t-4}$ $md_{t-3}$ $md_{t-2}$ $md_{t-1}$ $md_t$ |

FIG. 8A

| | | | |
|---|---|---|---|
| $wa_{(2)1}$ | $wa_{(2)2}$ | $wa_{(2)3}$ | $wa_{(2)4}$ |
| $wb_{(2)1}$ | $wb_{(2)2}$ | $wb_{(2)3}$ | $wb_{(2)4}$ |
| $wc_{(2)1}$ | $wc_{(2)2}$ | $wc_{(2)3}$ | $wc_{(2)4}$ |
| $wd_{(2)1}$ | $wd_{(2)2}$ | $wd_{(2)3}$ | $wd_{(2)4}$ |

⋮

| | | | |
|---|---|---|---|
| $wa_{(20)1}$ | $wa_{(20)2}$ | $wa_{(20)3}$ | $wa_{(20)4}$ |
| $wb_{(20)1}$ | $wb_{(20)2}$ | $wb_{(20)3}$ | $wb_{(20)4}$ |
| $wc_{(20)1}$ | $wc_{(20)2}$ | $wc_{(20)3}$ | $wc_{(20)4}$ |
| $wd_{(20)1}$ | $wd_{(20)2}$ | $wd_{(20)3}$ | $wd_{(20)4}$ |

FIG. 8B

| | | |
|---|---|---|
| $z_{(2)t-2}$ | $z_{(2)t-1}$ | $z_{(2)t}$ |

⋮

| | | |
|---|---|---|
| $z_{(20)t-2}$ | $z_{(20)t-1}$ | $z_{(20)t}$ |

FIG. 10A

| TIME | $t_1$ | $t_2$ | $t_3$ | $t_4$ | $t_5$ | $t_6$ | $t_7$ | $t_8$ | ・・・ |
|---|---|---|---|---|---|---|---|---|---|
| STATOR COIL TEMPERATURE Ts | $a_1$ | $a_2$ | $a_3$ | $a_4$ | $a_5$ | $a_6$ | $a_7$ | $a_8$ | ・・・ |
| MOTOR ROTATIONAL SPEED Rm | $b_1$ | $b_2$ | $b_3$ | $b_4$ | $b_5$ | $b_6$ | $b_7$ | $b_8$ | ・・・ |
| OIL TEMPERATURE Ti | $c_1$ | $c_2$ | $c_3$ | $c_4$ | $c_5$ | $c_6$ | $c_7$ | $c_8$ | ・・・ |
| OIL PUMP ROTATIONAL SPEED Rp | $d_1$ | $d_2$ | $d_3$ | $d_4$ | $d_5$ | $d_6$ | $d_7$ | $d_8$ | ・・・ |
| MAGNET TEMPERATURE Tr | $Tr_1$ | $Tr_2$ | $Tr_3$ | $Tr_4$ | $Tr_5$ | $Tr_6$ | $Tr_7$ | $Tr_8$ | ・・・ |

FIG. 10B

| TIME | $t_1$ | $t_2$ | $t_3$ | $t_4$ | $t_5$ | $t_6$ | $t_7$ | ・・・ |
|---|---|---|---|---|---|---|---|---|
| STATOR COIL TEMPERATURE Ts | $ma_1$ | $ma_2$ | $ma_3$ | $ma_4$ | $ma_5$ | $ma_6$ | $ma_7$ | ・・・ |
| MOTOR ROTATIONAL SPEED Rm | $mb_1$ | $mb_2$ | $mb_3$ | $mb_4$ | $mb_5$ | $mb_6$ | $mb_7$ | ・・・ |
| OIL TEMPERATURE Ti | $mc_1$ | $mc_2$ | $mc_3$ | $mc_4$ | $mc_5$ | $mc_6$ | $mc_7$ | ・・・ |
| OIL PUMP ROTATIONAL SPEED Rp | $md_1$ | $md_2$ | $md_3$ | $md_4$ | $md_5$ | $md_6$ | $md_7$ | ・・・ |
| MAGNET TEMPERATURE Tr | | | | $Tr_4$ | $Tr_5$ | $Tr_6$ | $Tr_7$ | ・・・ |

FIG. 11A

| TIMEt$_4$ | $(a_1 + a_2 + a_3 + a_4)/4 = ma_4$<br>$(b_1 + b_2 + b_3 + b_4)/4 = mb_4$<br>⋮ |
|---|---|
| TIMEt$_5$ | $(a_2 + a_3 + a_4 + a_5)/4 = ma_5$<br>$(b_2 + b_3 + b_4 + b_5)/4 = mb_5$<br>⋮ |
| GENERAL FORMULA | SMA = $\dfrac{\text{TOTAL SUM OF MOVING AVERAGE SECTIONS}}{\text{LENGTH OF MOVING AVERAGE SECTION}}$ |

FIG. 11B

| TIMEt$_4$ | $(a_1 + a_2 + a_3 + a_4 + a_4)/5 = ma_4$<br>$(b_1 + b_2 + b_3 + b_4 + b_4)/5 = mb_4$<br>⋮ |
|---|---|
| TIMEt$_5$ | $(ma_4 + ma_4 + ma_4 + a_5 + a_5)/5 = ma_5$<br>$(mb_4 + mb_4 + mb_4 + b_5 + b_5)/5 = mb_5$<br>⋮ |
| GENERAL FORMULA | EMA = [PREVIOUS EMA · (MOVING AVERAGE SECTION−1) + 2 · CURRENT INPUT VALUE] / [MOVING AVERAGE SECTION+1] |

MAGNET TEMPERATURE ESTIMATION DEVICE

FIELD

The present invention relates to a magnet temperature estimation device.

BACKGROUND

In a rotating type electric motor comprised of a rotor provided with permanent magnets and of a stator, if the permanent magnets become high in temperature, the permanent magnets will fall in magnetic force, so the electric motor will no longer be able to generate the scheduled output. Therefore, a need arises for detecting the temperature of the permanent magnets. However, in commercially available vehicles, detecting the temperature of the permanent magnets attached to a rotor is difficult. Therefore, there is known a magnet temperature estimation device designed to estimate the temperature of the permanent magnets attached to a rotor (for example, see Japanese Unexamined Patent Publication No. 2014-93867).

In this magnet temperature estimation device, roughly speaking, the amount of temperature rise per unit time of the rotor is calculated from the difference between the amount of heat radiated per unit time from the rotor to the oil calculated based on the temperature difference between the estimated temperature of the rotor and the temperature of the oil flowing around the rotor and the amount of heat radiated per unit time from the rotor to the oil calculated based on the amount of temperature rise of the oil. The calculated amount of temperature rise per unit time of the rotor is cumulatively added to estimate the temperature of the rotor, that is, the temperature of the magnets.

SUMMARY

However, if estimating the temperature of the magnets by cumulatively adding the amount of temperature rise per unit time calculated in this way, there is the problem that error will build up while cumulatively adding the amount of temperature rise per unit time and that the estimated value of the magnet temperature will greatly diverge from the actual magnet temperature in many cases.

Therefore, according to the present invention, there is provided a magnet temperature estimation device comprising
  a parameter acquiring unit for acquiring parameters relating to rotation of a motor concerned, measured every constant time period,
  a calculating unit for calculating a moving average of every constant interval of the parameters,
  a temperature acquiring unit for inputting the moving averages calculated by the calculating unit into a training model trained so as to output a temperature of the magnets attached to a rotor of the motor when the moving averages of the parameters relating to rotation of the motor are input to acquire an estimated value of the magnet temperature output from the training model, and
  an output unit for outputting the estimated value of the magnet temperature which the temperature acquiring unit acquires.

According to the present invention, it is possible to accurately estimate the magnet temperature.

BRIEF DESCRIPTION OF DRAWINGS

FIG. 4A and FIG. 4B are views for explaining 1D convolutional processing.
FIG. 6 is a view for explaining 1D convolutional processing.
FIG. 8A and FIG. 8B are views for explaining 1D convolutional processing.
FIG. 10A and FIG. 10B are respectively views showing a list of the acquired parameters and a list of the moving averages.
FIG. 11A and FIG. 11B are respectively views for explaining simple moving average processing and exponential moving average processing.

DESCRIPTION OF EMBODIMENTS

Figure 1:
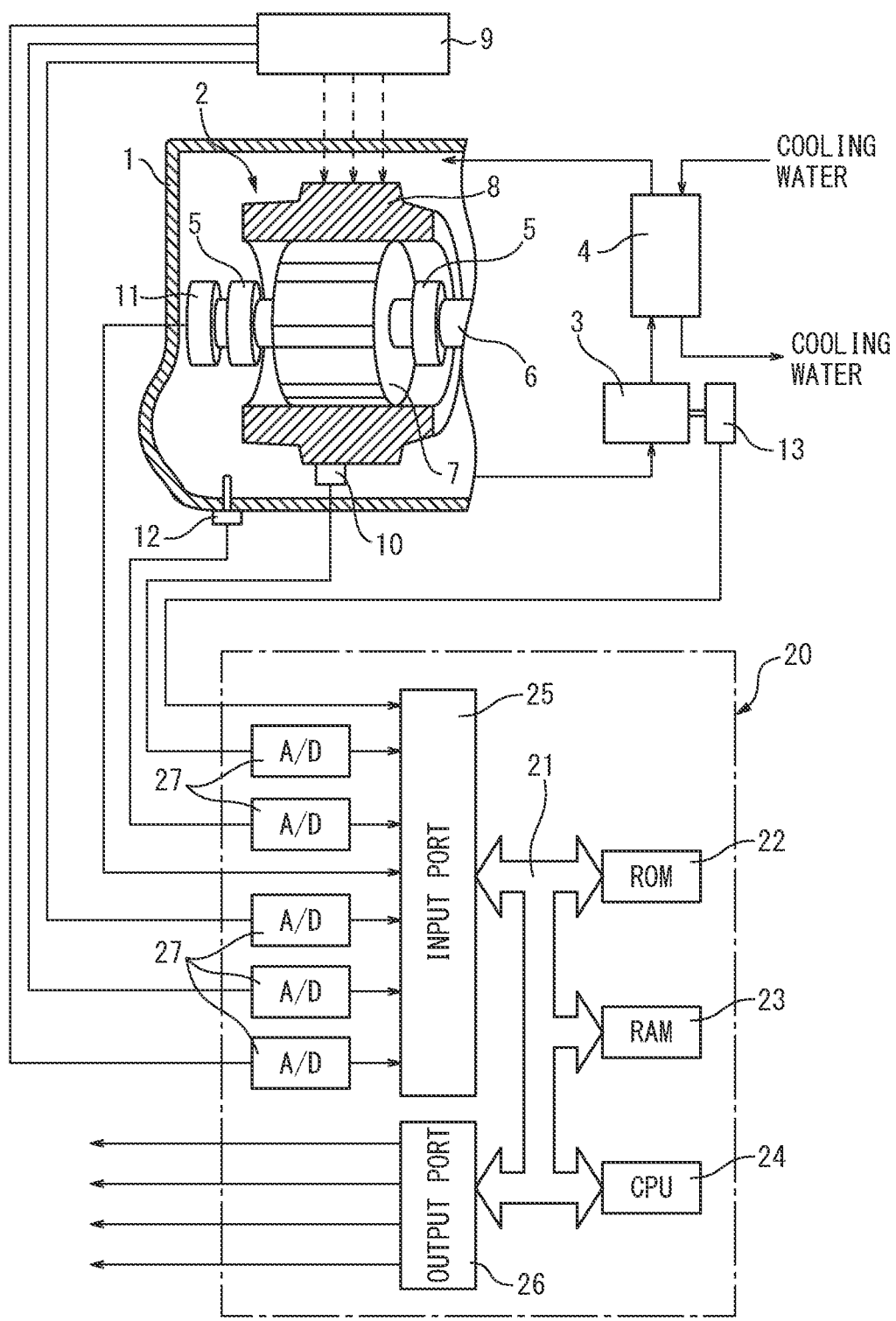
FIG. 1 is an overall view of a magnet temperature estimation device.

Referring to FIG. 1, 1 indicates a housing of a transaxle of a hybrid vehicle, 2 indicates a motor for driving the vehicle, 3 indicates an oil pump, and 4 indicates an oil cooler. The motor 2 is comprised of a shaft 6 supported to be able to rotate by bearings 5, a rotor 7 fixed to the shaft 6, and a stator 8 surrounding the rotor 7. In the embodiment of the present invention, permanent magnets (not shown) are attached to the rotor 7. In this case, the permanent magnets are sometimes embedded inside the rotor 7 and are sometimes fixed on the outer circumferential surface of the rotor 7. On the other hand, a stator coil (not shown) is arranged inside the stator 8. If the stator coil is supplied with drive current, the interaction with the magnetic fields of the permanent magnets which the rotor 7 is provided with causes the rotor 7 to turn. Note that, the motor 2 is not only used as a source of drive power of the vehicle, but is also used as a generator. The supply of drive current to the stator coil is controlled by an inverter 9. This inverter 9 is controlled by an electronic control unit 20.

Inside the housing 1 of the transaxle, oil for lubricating and cooling the motor 2 and speed reduction gear mechanism is supplied. The oil pooling at the bottom part inside the housing 1 of the transaxle is sent by the oil pump 3 to the oil cooler 4. Oil cooled by a heat exchange action with the engine cooling water inside the oil cooler 4 is again sent to the inside of the housing 1 of the transaxle. The oil pump 3 is sometimes driven by the engine and is sometimes driven by the oil pump-drive motor. In the embodiment shown in FIG. 1, the oil pump 3 is driven by the engine.

As shown in FIG. 1, the electronic control unit 20 is comprised of a digital computer provided with a ROM (read only memory) 22, RAM (random access memory) 23, CPU (microprocessor) 24, input port 25, and output port 26, which are connected with each other by a bidirectional bus 21. At the stator 8, a temperature sensor 10 for measuring the temperature of the stator coil is attached. The output signal of this temperature sensor 10 is input through a corresponding AD converter 27 to the input port 25. At the shaft 6 of the motor 2, a rotational speed sensor 11 for measuring a rotational speed of the motor 2 is attached. The output signal of this rotational speed sensor 11 is input through a corresponding AD converter 27 to the input port 25.

Further, at the bottom part inside of the housing 1 of the transaxle, a temperature sensor 12 for measuring the temperature of the oil pooled inside the housing 1 of the oil transaxle is attached. The output signal of this temperature sensor 12 is input through a corresponding AD converter 27 to the input port 25. Furthermore, at the oil pump 3, a rotational speed sensor 13 for measuring the rotational speed of the oil pump 3 is attached. The output signal of this rotational speed sensor 13 is input through a corresponding AD converter 27 to the input port 25. Note that, if the oil pump 3 is driven by the engine, as the rotational speed sensor 13, a rotational speed sensor for detecting the engine rotational speed can be used.

On the other hand, from the inverter 9, signals showing the drive current of the motor 2, the drive voltage of the motor 2, and the inverter frequency are input through respectively corresponding AD converters 27 to the input port 25. In this case, inside the electronic control unit 20, the drive torque of the motor 2 is calculated from the drive current of the motor 2 and the drive voltage of the motor 2.

Now then, if the permanent magnets become high in temperature, the magnetic force falls. Therefore, if the temperature of the permanent magnets attached to the rotor 7 becomes high, the motor 7 can no longer generate the scheduled output. Therefore, a need arises for detecting the temperature of the permanent magnets. However, in commercially available vehicles, it is difficult to detect the temperature of the permanent magnets attached to the rotor 7. Therefore, it becomes necessary to estimate the temperature of the permanent magnets. Thus, as a result of repeatedly studying the temperature of the permanent magnets, it has been learned that the temperature of the permanent magnets attached to the rotor 7 is correlated with parameters relating to rotation of the motor 7 and, further, the temperature of the permanent magnets attached to the rotor 7 is greatly affected by the changes along with time in these parameters from the past to the present.

Figure 2:
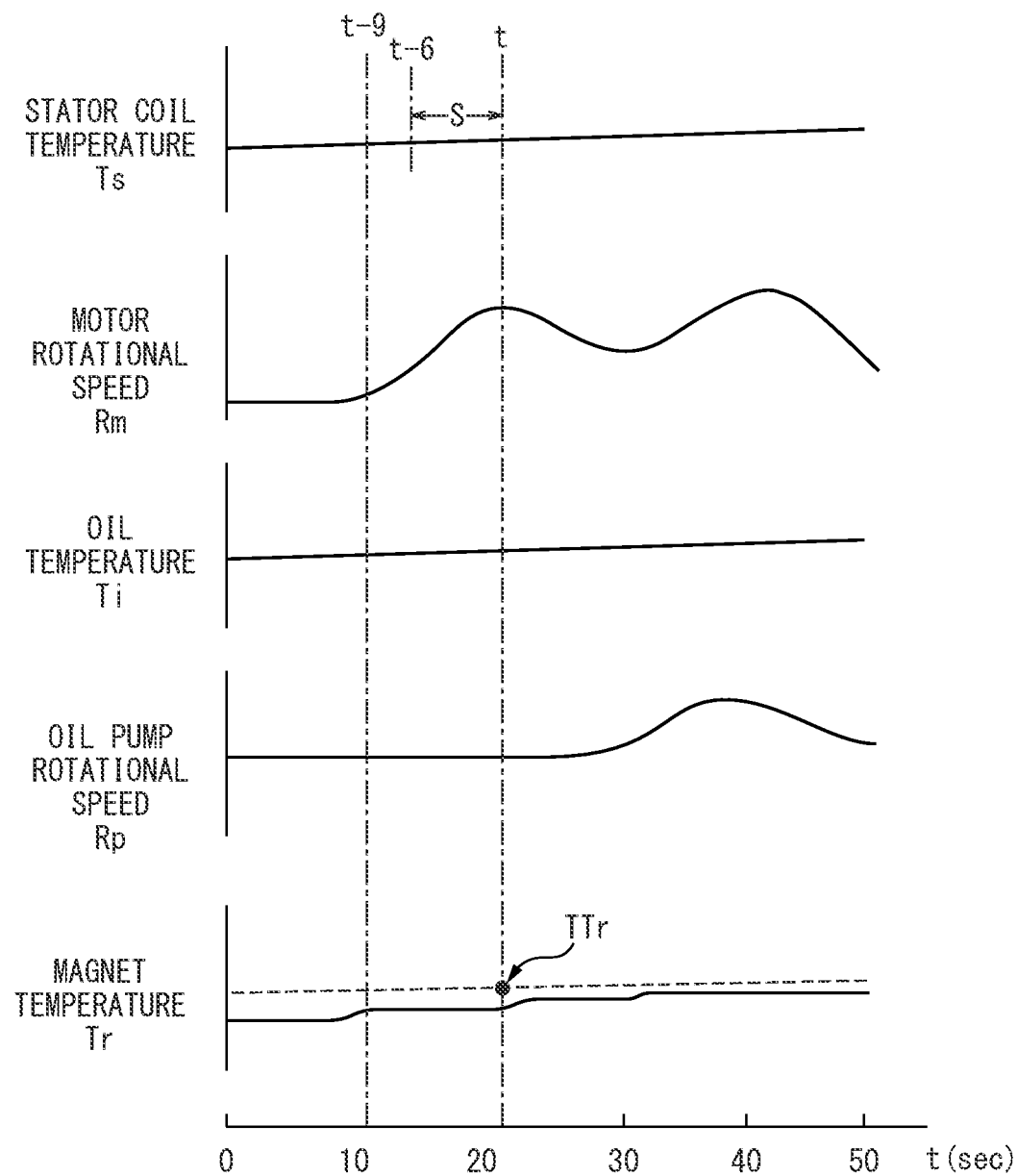
FIG. 2 is a time chart for explaining a method of estimation of a magnet temperature.

In this case, the temperature of the permanent magnets attached to the rotor 7 is particularly strongly correlated with the temperature of the stator coil, the rotational speed of the motor 2, the temperature of the oil, and the rotational speed of the oil pump 3 among the parameters relating to the rotation of the motor, and it has been learned that the changes along with time in these temperature of the stator coil, rotational speed of the motor 2, temperature of the oil, and rotational speed of the oil pump 3 from the past to the present greatly affect the temperature of the permanent magnets attached to the rotor 7. In FIG. 2, an example of the changes along with time in the temperature Ts of the stator coil, the rotational speed Rm of the motor 2, the temperature Ti of the oil, and the rotational speed Rp of the oil pump 3 is shown. Furthermore, in FIG. 2, the actual change along with time of the temperature Tr of the permanent magnets attached to the rotor 7 is shown by the solid line.

Note that, in FIG. 2, the temperature Ts of the stator coil is measured by the temperature sensor 10, the rotational speed Rm of the motor 2 is measured by the rotational speed sensor 11, the temperature Ti of the oil is measured by the temperature sensor 12, and the rotational speed Rp of the oil pump 3 is measured by the rotational speed sensor 13. On the other hand, the actual temperature Tr of the permanent magnets attached to the rotor 7 is for example detected using a telemeter able to wirelessly send for example temperature information detected by a thermistor to the outside. In this case, the telemeter is embedded in the rotor 7 so as to enable detection of the actual temperature Tr of the permanent magnets. Further, as the actual temperature Tr of the permanent magnets attached to the rotor 7, it is also possible to use the temperature obtained by simulation.

Now then, as explained above, it is learned that the changes along with time of the temperature Ts of the stator coil, the rotational speed Rm of the motor 2, the temperature Ti of the oil, and the rotational speed Rp of the oil pump 3 from the past to the present greatly affect the temperature of the permanent magnets attached to the rotor 7. Therefore, in the embodiment of the present invention, a 1D convolutional neural network is used to try to estimate the current temperature Tr of the permanent magnets attached to the rotor 7 from the changes along with time of the temperature Ts of the stator coil, the rotational speed Rm of the motor 2, the temperature Ti of the oil, and the rotational speed Rp of the oil pump 3 from the past to the present. Note that, in FIG. 2, the broken line shows the change of the estimated value of the temperature Tr of the permanent magnets attached to the rotor 7.

Now then, in the embodiment of the present invention, the measured values of the temperature Ts of the stator coil, the rotational speed Rm of the motor 2, the temperature Ti of the oil, and the rotational speed Rp of the oil pump 3 are acquired every 1 second. In this case, in the embodiment of the present invention, the 1D convolutional neural network is used to find the estimated value TTr of the current temperature Tr of the permanent magnets attached to the rotor 7 from the time series data of the temperature Ts of the stator coil, the rotational speed Rm of the motor 2, the temperature Ti of the oil, and the rotational speed Rp of the oil pump 3 acquired every 1 second in the 10 seconds from a time t-9 to a time "t".

Figure 3:
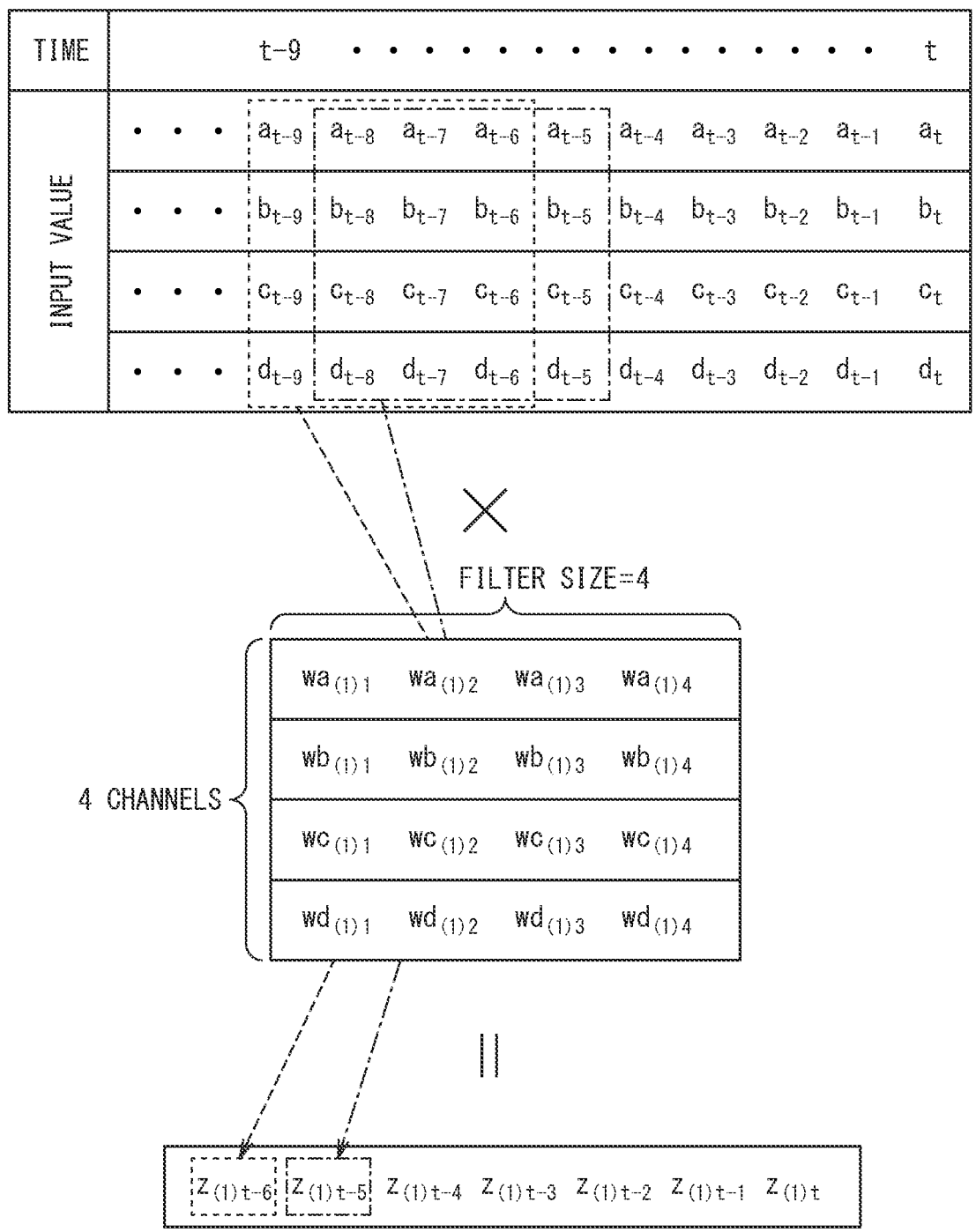
FIG. 3 is a view for explaining 1D convolutional processing.

Therefore, next, taking as an example the case shown in FIG. 2, an outline of the method of estimation using the 1D convolutional neural network will be explained while referring to FIG. 3 to FIG. 5. The upper part of FIG. 3 shows a list of the measured values "a", "b", "c", and "d" for every 1 second in the 10 seconds from the time t-9 to the time "t". In the case shown in FIG. 2, these measured values "a", "b", "c", and "d" show the measured values of the temperature Ts of the stator coil, the rotational speed Rm of the motor 2, the temperature Ti of the oil, and the rotational speed Rp of the oil pump 3.

On the other hand, the filter applied to these measured values "a", "b", "c", and "d" is shown at the center part of FIG. 3. This filter respectively assigns to the measured values "a", "b", "c", and "d" the four elements $wa_{(1)1}$ to $wa_{(1)4}$, $wb_{(1)1}$ to $wb_{(1)4}$, $wc_{(1)1}$ to $wc_{(1)4}$, and $wd_{(1)1}$ to $wd_{(1)4}$. That is, this filter is made one of a filter size of 4 and a number of channels of 4. In this case, first, at the time t-6 (FIG. 3), the sum of products of the measured values "a", "b", "c", and "d" of the time t-9 to the time t-6 surrounded by the broken line at the upper part of FIG. 3 and the values of the elements corresponding to the filter are calculated. That is, the measured values "a", "b", "c", and "d" of the time t-9 to the time t-6 surrounded by the broken line at the upper part of FIG. 3 are multiplied with values of corresponding elements of the filter and the sum of the 16 results of multiplication obtained $(a_{t-9} \cdot wa_{(1)1} + a_{t-8} \cdot wa_{(1)2} + \ldots + d_{t-7} \cdot wd_{(1)3} + d_{t-6} \cdot wd_{(1)4})$ is calculated. The value of the thus calculated sum of products is made the output value $z_{(i)t-6}$ at the time t-6 surrounded by the broken line at the lower part of FIG. 3.

Next, at the time t-5 of FIG. 3, the sum of products of the measured values "a", "b", "c", and "d" of the time t-8 to the time t-5 surrounded by the dash and dot line at the upper part of FIG. 3 and the values of the corresponding elements of the filter $(a_{t-8} \cdot wa_{(1)1} + a_{t-7} \cdot wa_{(1)2} + \ldots + d_{t-6} \cdot wd_{(1)3} + d_{t-5} \cdot wd_{(1)4})$ are calculated. The value of the thus calculated sum of products is made the output value $z_{(1)t-5}$ at the time t-5 surrounded by the dash and dot line at the lower part of FIG. 3. That is, the measured values "a", "b", "c", and "d" of the time t-9 to the time t-6 surrounded by the broken line at the upper part of FIG. 3 are convoluted by the filter and the result is made the output value $z_{(1)t-6}$, while the measured values "a", "b", "c", and "d" of the time t-8 to the time t-5 surrounded by the dash and dot line at the upper part of FIG. 3 are convoluted by the filter and the result made the output value $z_{(1)t-5}$.

By convoluting the measured values "a", "b", "c", and "d" by the filter in this way while making the filter move a little at a time, the output values $(z_{(1)t-6} \ldots z_{(1)t})$ from the time t-6 to the time "t" are calculated. On the other hand, in this example of the 1D convolutional neural network, as shown in FIG. 4A, further 19 filters of a filter size=4 and number of channels=4 are used. In these 19 filters, the measured values "a", "b", "c", and "d" are convoluted by the filters while making the filters move a little at a time whereby, as shown in FIG. 4B, 19 output values from the time t-6 to the time "t" $(z_{(2)t-6} \ldots z_{(2)t}) \ldots (z_{(20)t-6} \ldots z_{(20)t})$ are calculated. That is, in total, 20 output values from the time t-6 to the time "t" $(z_{(1)t-6} \ldots z_{(1)t}) \ldots (z_{(20)t-6} \ldots z_{(20)t})$ are calculated. These output values from the time t-6 to the time "t" are used for training the 1D convolutional neural network, and by using the trained 1D convolutional neural network, the estimated value TTr of the current temperature Tr of the permanent magnets attached to the rotor 7 is found. Note that, in this case as well, the amounts of movement of the filters may be made any amounts of movement, that is, any strides.

Figure 5:
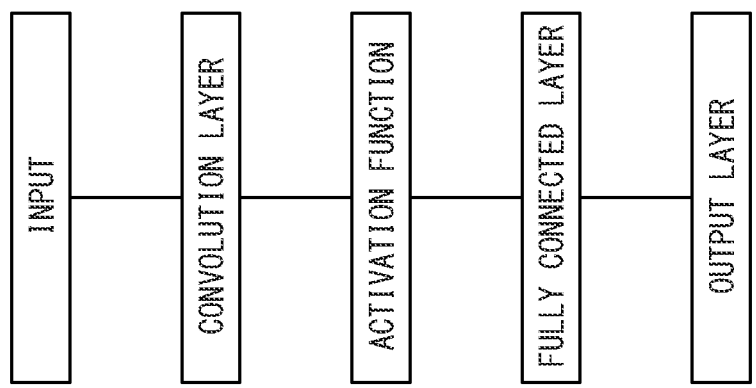
FIG. 5 is a view showing a structure of a 1D convolutional neural network.

FIG. 5 shows the structure of the 1D convolutional neural network. If the measured values "a", "b", "c", and "d" such as shown in FIG. 3 are input to the 1D convolutional neural network, at the convolution layer of FIG. 5, these measured values "a", "b", "c", and "d" are processed by convolution by the filters and, in total, such as shown in FIG. 3 and FIG. 4B, 20 output values $(z_{(1)t-6} \ldots z_{(1)t}) \ldots (z_{(20)t-6} \ldots z_{(20)t})$ from the time t-6 to the time "t" are calculated. These output values are multiplied with a Sigmoid function or other activation function and the output values multiplied with the activation function are input to the nodes of the fully connected layer. Note that, in this case, it is also possible to provide a pooling layer before the fully connected layer. The outputs from the nodes of the fully connected layer are input to the nodes of the output layer, and the estimated value TTr of the current temperature Tr of the permanent magnets is output from the node of the output layer.

In this regard, if the measured values "a", "b", "c", and "d" for each 1 second in the 10 seconds from the time t-9 to the time "t" such as shown in the list of the upper part of FIG. 3 are processed by convolution by the filters, since the amount of data to be stored is large, a large storage capacity becomes necessary. Furthermore, since the amount of weights to be trained in the 1D convolutional neural network is large, time is required for finding the estimated value TTr of the current temperature Tr of the permanent magnets. Therefore, in the embodiment of the present invention, in order to reduce the stored amount of data and reduce the amount of weights to be trained while retaining such a state that the changes along with time of the measured values "a", "b", "c", and "d" from the past to the present do not adversely affect the estimated value TTr of the current temperature Tr of the permanent magnets, the moving averages of the measured values "a", "b", "c", and "d" are found, and the moving averages of the measured values "a", "b", "c", and "d" found are processed by convolution by the filters.

Therefore, next, while referring to FIG. 6 to FIG. 8B, the1D convolutional processing using moving averages will be explained. First, referring to FIG. 6, at the upper part of FIG. 6, a list of the measured values "a", "b", "c", and "d" for every 1 second in the 10 seconds from the time t-9 to the time "t" the same as the list shown at the upper part of FIG. 3 is shown. In the embodiment of the present invention, the measured values "a", "b", "c", and "d" shown at the upper part of FIG. 6 are processed to find the moving averages. In the example shown in FIG. 6, at the time t-5, for the measured values "a", the moving average of the measured values $(a_{t-9}, a_{t-8}, a_{t-7}, a_{t-6},$ and $a_{t-5})$ in the past 5 seconds from the time t-9 to the time t-5 surrounded by the broken line in the upper part of FIG. 6 is calculated. This moving average of the measured values $(a_{t-9}, a_{t-8}, a_{t-7}, a_{t-6},$ and $a_{t-5})$ is made the $ma_{t-5}$ surrounded by the broken line at the time t-5 of the list at the lower part of FIG. 6. Further, at the time t-4, for the measured values "a", the moving average of the measured values $(a_{t-8}, a_{t-7}, a_{t-6}, a_{t-5},$ and $a_{t-4})$ in the past 5 seconds from the time t-8 to the time t-4 surrounded by the dash and dot line in the upper part of FIG. 6 is calculated. This moving average of the measured values $(a_{t-8}, a_{t-7}, a_{t-6}, a_{t-5},$ and $a_{t-4})$ is made the $ma_{t-4}$ surrounded by the dash and dot line at the time t-4 of the list at the lower part of FIG. 6.

In the same way, the moving averages $ma_{t-3}$, $ma_{t-2}$, $ma_{t-1}$, and $ma_t$ from the time t-3 to the time "t" are calculated. Further, like what is shown in the list at the lower part of FIG. 6, for the measured values "b" as well, similarly the moving averages $mb_{t-5}$, $mb_{t-4}$, $mb_{t-3}$, $mb_{t-2}$, $mb_{t-1}$, and $mb_t$ from the time t-5 to the time "t" are calculated, for the measured values "c" as well, similarly the moving averages $mc_{t-5}$, $mc_{t-4}$, $mc_{t-3}$, $mc_{t-2}$, $mc_{t4}$, and $mc_t$ from the time t-5 to the time "t" are calculated, and for the measured values "d" as well, similarly the moving averages $md_{t-5}$, $md_{t-4}$, $md_{t-3}$, $md_{t-2}$, $md_{t-1}$, and $md_t$ from the time t-5 to the time "t" are calculated. For all of the measured values "a", "b", "c", and "d" from the time t-9 to the time "t", if the moving averages $ma_{t-5}$, $ma_{t-4} \ldots$, $md_{t-1}$, and $md_t$ such as shown in the list at the lower part of FIG. 6 are calculated, these moving averages $ma_{t-5}$, $ma_{t-4} \ldots$, $md_{t-1}$, and $md_t$ are processed by the 1D convolution.

Next, this 1D convolutional processing of the moving averages $ma_{t-5}$, $ma_{t-4}$ ..., $md_{t-1}$, and $md_t$ will be explained while referring to FIG. 7 to FIG. 8B. Note that, this 1D convolutional processing of the moving averages $ma_{t-5}$, $ma_{t-4}$ ..., $md_{t-1}$, and $md_t$ is performed by a method similar to the 1D convolutional processing explained with reference to FIG. 3 to FIG. 4B. If referring to FIG. 7, at the upper part of FIG. 7, a list the same as the list shown at the lower part of FIG. 6 is shown. On the other hand, at the center part of FIG. 7, a filter applied to the moving averages $ma_{t-5}$, $ma_{t-4}$ ... $md_{t-1}$, and $md_t$ is shown. In this filter as well, in the same way as the filter shown at the center part of FIG. 3, the filter size is 4 and the number of channels is also 4.

Figure 7:
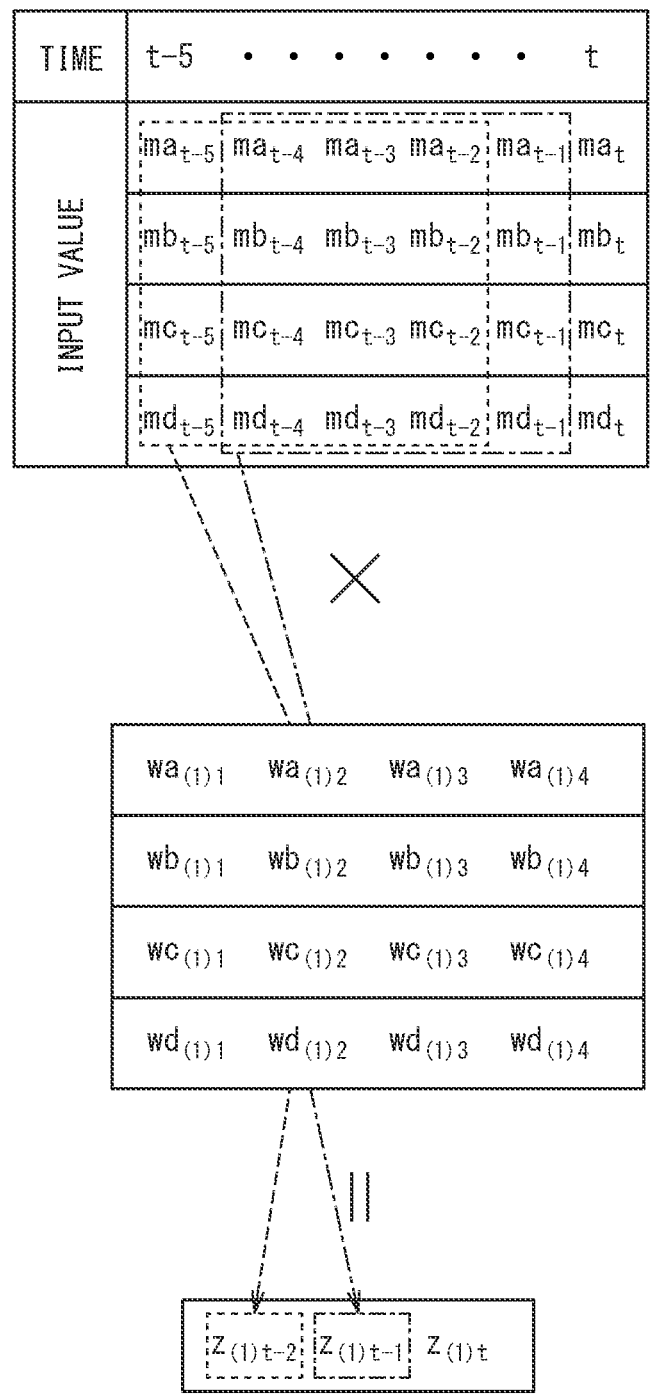
FIG. 7 is a view for explaining 1D convolutional processing.

In this case as well, first, at the time t-2 of FIG. 7, the sum of products of the moving averages $ma_{t-5}$, $ma_{t-4}$ ... $md_{t-3}$, and $md_{t-2}$ from the time t-5 to the time t-2 surrounded by the broken line in the upper part of FIG. 7 and the values of the corresponding elements of the filter is calculated. That is, the moving averages $ma_{t-5}$, $ma_{t-4}$ ... $md_{t-3}$, and $md_{t-2}$ from the time t-5 to the time t-2 surrounded by the broken line in the upper part of FIG. 7 are multiplied with the values of the corresponding elements of the filter, and the sum of the 16 obtained results of multiplication ($ma_{t-5} \cdot wa_{(1)1} + ma_{t-4} \cdot wa_{(1)2} + \ldots + md_{t-3} \cdot wd_{(1)3} + md_{t-2} \cdot wd_{(1)4}$) is calculated. The value of the thus calculated sum of products is made the output value $z_{(1)t-2}$ at the time t-2 surrounded by the broken line at the lower part of FIG. 7.

Next, at the time t-1 of FIG. 7, the sum of products of the moving averages $ma_{t-4}$, $ma_{t-3}$ ... $md_{t-2}$, and $md_{t-1}$ from the time t-4 to the time t-1 surrounded by the dash and dot line at the upper part of FIG. 7 and the values of the corresponding elements of the filter ($ma_{t-4} \cdot wa_{(1)1} + ma_{t-3} \cdot wa_{(1)2} + \ldots + md_{t-2} \cdot wd_{(1)3} + md_{t-1} \cdot wd_{(1)4}$) is calculated. The value of the thus calculated sum of products is made the output value $z_{(1)t-1}$ at the time t-1 surrounded by the dash and dot line at the lower part of FIG. 7. That is, the moving averages $ma_{t-5}$, $ma_{t-4}$ ... $md_{t-3}$, and $md_{t-2}$ from the time t-5 to the time t-2 surrounded by the broken line at the upper part of FIG. 7 are processed by convolution by the filter and the result is made the output value $z_{(1)t-2}$ while the moving averages $ma_{t-4}$, $ma_{t-3}$ ... $md_{t-2}$, and $md_{t-1}$ from the time t-4 to the time t-1 surrounded by the dash and dot line at the upper part of FIG. 7 are processed by convolution by the filter and the result is made the output value $z_{(1)t-1}$.

By processing the moving averages $ma_{t-5}$, $ma_{t-4}$ ... $md_{t-1}$, and $md_t$ by convolution by a filter while making the filter move a little at a time in this way, the output value ($z_{(1)t-2}$ ... $z_{(1)t}$) from the time t-2 to the time "t" is calculated. On the other hand, in this example of the 1D convolutional neural network, as shown in FIG. 8A, further 19 filters of the filter size=4 and number of channels=4 are used. Regarding these 19 filters, the moving averages $ma_{t-5}$, $ma_{t-4}$ ... $md_{t-1}$, and $md_t$ are convoluted by the filters while making the filters move a little at a time whereby, as shown in FIG. 8B, 19 output values from the time t-2 to the time "t" ($z_{(2)t-2}$ ... $z_{(2)t}$) ... ($z_{(20)t-2}$ ... $z_{(20)t}$) are calculated. That is, in total, 20 output values from the time t-2 to the time "t" ($z_{(1)t-2}$ ... $z_{(1)t}$) ... ($z_{(20)t-2}$ ... $z_{(20)t}$) are calculated. These output values from the time t-2 to the time "t" are used for training the 1D convolutional neural network, and by using the trained 1D convolutional neural network, the estimated value TTr of the current temperature Tr of the permanent magnets which the rotor 7 is provided with is found. Note that, in this case as well, the amounts of movement of the filters may be made any amounts of movement, that is, any strides.

Figure 9:
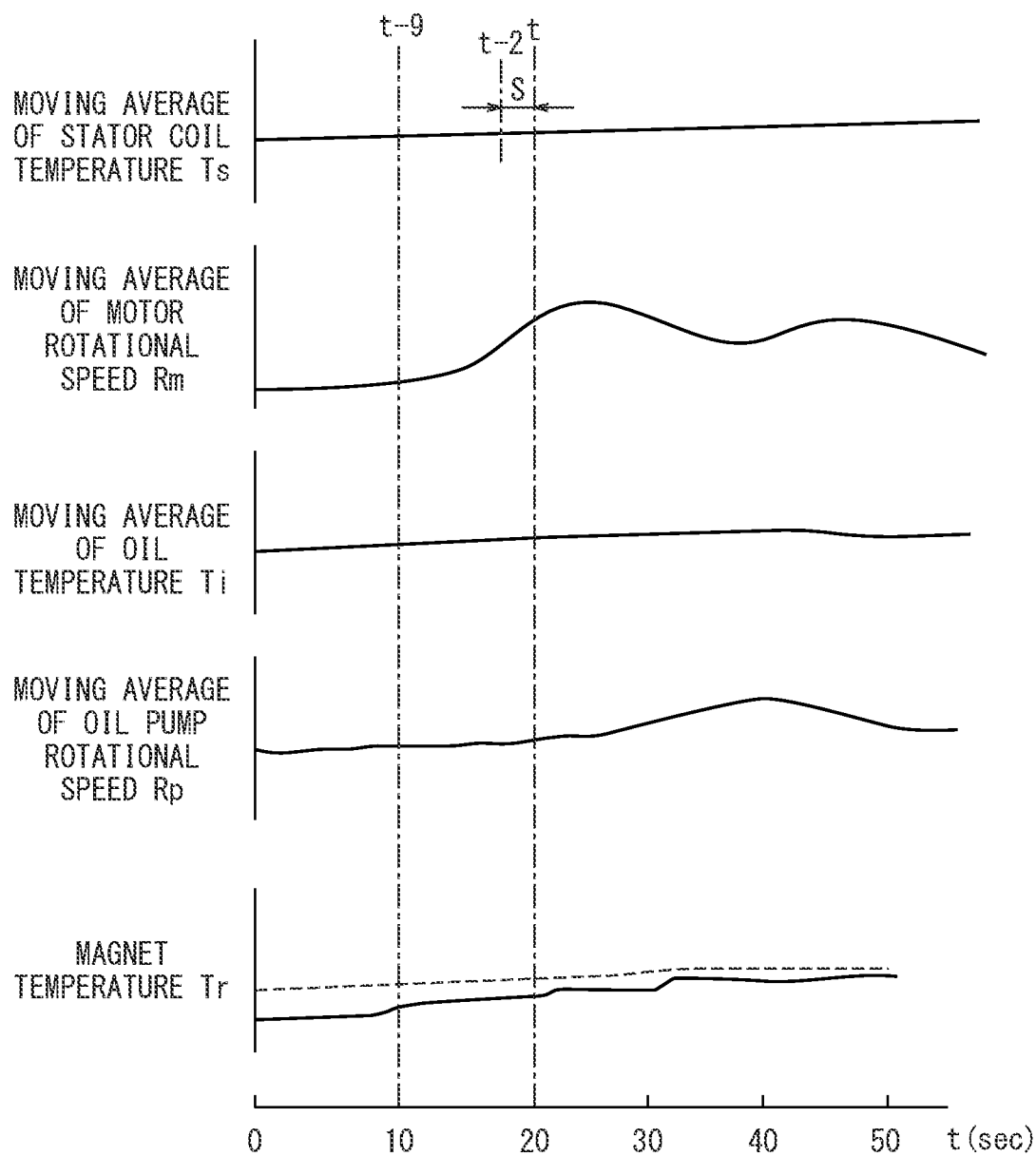
FIG. 9 is a time chart for explaining a method of estimation of a magnet temperature.

FIG. 9 shows an example of the changes along with time of the moving averages of the temperature Ts of the stator coil, the rotational speed Rm of the motor 2, the temperature Ti of the oil, and the rotational speed Rp of the oil pump 3, the change along with time (solid line) of the actual temperature Tr of the permanent magnets which the rotor 7 is provided with, and the change along with time (broken line) of the estimated value of the temperature Tr of the permanent magnets which the rotor 7 is provided with when performing the moving average processing for the measured values of the temperature Ts of the stator coil shown in FIG. 2, the measured values of the rotational speed Rm of the motor 2 shown in FIG. 2, the measured values of the temperature Ti of the oil shown in FIG. 2, and the measured values of the rotational speed Rp of the oil pump 3 shown in FIG. 2, respectively.

In this regard, in the example shown in FIG. 9, as explained above, the output values from the time t-2 to the time "t" are used to train the 1D convolutional neural network. Therefore, the training period of the 1D convolutional neural network becomes the range shown by S in FIG. 9. As opposed to this, in the example shown in FIG. 2, as explained above, the output values from the time t-6 to the time "t" are used to train the 1D convolutional neural network. Therefore, the training period of the 1D convolutional neural network becomes the range shown by S in FIG. 2. In this case, in both the case shown in FIG. 9 and the case shown in FIG. 2, the amounts of information used for training the 1D convolutional neural network are substantially the same. Therefore, if processing the moving averages $ma_{t-5}$, $ma_{t-4}$ ... $md_{t-1}$, and $md_t$ by convolution, that is, in the case shown in FIG. 9, compared with the case shown in FIG. 2, it is possible to maintain the amount of information used for training substantially the same while shortening the training period of the 1D convolutional neural network. As a result, it is possible to slash the amount of data held and possible to reduce the required storage capacity.

Next, referring to FIG. 10A and FIG. 10B, the processing for training the 1D convolutional neural network will be explained. The processing for training this 1D convolutional neural network is for example performed inside the electronic control unit 20 shown in FIG. 1. When training the 1D convolutional neural network, first, the drive load of the vehicle is made to change in various ways. At this time, the temperature Ts of the stator coil, the rotational speed Rm of the motor 2, the temperature Ti of the oil, the rotational speed Rp of the oil pump 3, and the actual temperature Tr of the permanent magnets which the rotor 7 is provided with, measured every unit time, for example, every 1 second, are stored in the RAM 23 of the electronic control unit 20. FIG. 10A shows the temperature Ts of the stator coil, the rotational speed Rm of the motor 2, the temperature Ti of the oil, the rotational speed Rp of the oil pump 3, and the actual temperature Tr of the permanent magnets which the rotor 7 is provided with at the times $t_1$, $t_2$, $t_3$, $t_4$, $t_5$, $t_6$, $t_7$, $t_8$ ... stored in the RAM 23 of the electronic control unit 20. Note that, the time $t_1$ at FIG. 10A shows the time when the temperature Ts of the stator coil etc. start being stored.

Inside the electronic control unit 20, the moving averages are calculated from the measured values shown in FIG. 10A stored in the RAM 23 of the electronic control unit 20. The calculated moving averages are stored in the RAM 23 of the electronic control unit 20. FIG. 10B shows a list of the moving averages stored in the RAM 23 of the electronic control unit 20. Note that, below, as one example, the case of finding the moving averages of the measured values in the past 4 seconds will be used as an example to explain the moving averages shown in the list of FIG. 10B while referring to FIG. 11A and FIG. 11B.

FIG. 11A shows the case of using as the moving averages moving averages obtained by simple moving averages (SMA). In this case, as shown in FIG. 11A, the moving average $ma_4$ at the time $t_4$ of FIG. 10B is the simple average of the measured values $a_1$, $a_2$, $a_3$, and $a_4$ from the time $t_1$ to the time $t_4$ of FIG. 10A, while the moving average $mb_4$ at the time $t_4$ of FIG. 10B is the simple average of the measured values $b_1$, $b_2$, $b_3$, and $b_4$ from the time $t_1$ to the time $t_4$ of FIG. 10A. The same is true for the remaining moving averages $mc_4$ and $md_4$ at the time $t_4$ of FIG. 10B.

Further, as shown in FIG. 11A, the moving average $ma_5$ at the time $t_5$ of FIG. 10B is the simple moving average of the measured values $a_2$, $a_3$, $a_4$, and $a_5$ of the time $t_2$ to the time $t_5$ of FIG. 10A, while the moving average $mb_5$ at the time $t_5$ of FIG. 10B is the simple moving average of the measured values $b_2$, $b_3$, $b_4$, and $ba_5$ of the time $t_2$ to the time $t_5$ of FIG. 10A. The same is true for the remaining moving averages $mc_5$ and $md_5$ at the time $t_5$ of FIG. 10B. Note that, in FIG. 11A, the general formula of this simple moving average (SMA) is shown.

On the other hand, FIG. 11B shows the case of using as the moving averages moving averages obtained by exponential moving averages (EMA). An exponential moving average (EMA) uses the previous exponential moving averages (EMA) instead of the past measured values and doubles the current measured values for giving weight to the current measured values to find the average of these. When the previous exponential moving averages (EMA) have not been calculated, the exponential moving average (EMA) is calculated using the measured values.

For example, at the times $t_1$, $t_2$, and $t_3$ of FIG. 10B, the exponential moving average (EMA) is not calculated. Therefore, at the time $t_4$ of FIG. 10B, the measured values are used to calculate the exponential moving average (EMA). That is, as shown in FIG. 11B, the exponential moving average $ma_4$ at the time $t_4$ of FIG. 10B is made a value obtained by dividing the value of the sum of the measured values $a_1$, $a_2$, and $a_3$ from the time $t_1$ to the time $t_3$ of FIG. 10A and double the measured value $a_4$ at the time $t_4$ by the number of terms of the numerator (=5), while the exponential moving average $mb_4$ at the time $t_4$ of FIG. 10B is made a value obtained by dividing the value of the sum of the measured values $b_1$, $b_2$, and $b_3$ from the time $t_1$ to the time $t_3$ of FIG. 10A and double the measured value $b_4$ at the time $t_4$ by the number of terms of the numerator (=5). The same is true for the remaining exponential moving averages $mc_4$ and $md_4$ at the time $t_4$ of FIG. 10B.

On the other hand, as shown in FIG. 11B, for calculation of the exponential moving average $ma_5$ at the time $t_5$ of FIG. 10B, the previous exponential moving average $ma_4$ is used instead of the measured values $a_2$, $a_3$, and $a_4$ from the time $t_2$ to the time $t_4$ of FIG. 10A, the exponential moving average $ma_5$ is made a value obtained by dividing the value of the sum of the three previous exponential moving averages $ma_4$ and double the measured value $a_5$ at the time $t_5$ by the number of terms of the numerator (=5), and the exponential moving average $mb_5$ of the time $t_5$ of FIG. 10B is made a value obtained by dividing the value of the sum of the three previous exponential moving averages $mb_4$ and double the measured value $b_5$ at the time $t_5$ by the number of terms of the numerator (=5). The same is true for the remaining moving averages $mc_5$ and $md_5$ at the time $t_5$ of FIG. 10B. Note that, in FIG. 11B, the general formula of this exponential moving average (EMA) is shown.

The weights of the 1D convolutional neural network are trained using the 1D convolutional neural network shown in FIG. 5 based on the list of moving averages shown in FIG. 10B stored in the RAM 23 of the electronic control unit 20. That is, FIG. 10B shows the training-use data sets for training the weights of the 1D convolutional neural network. At the time of training the weights of the 1D convolutional neural network, first, the moving averages $ma_4 \ldots ma_9$, $mb_4 \ldots mb_9$, $mc_4 \ldots mc_9$, and $md_4 \ldots md_9$ from the time $t_4$ to the time $t_9$ are input to the 1D convolutional neural network shown in FIG. 5 and the input moving averages $ma_4 \ldots ma_9$, $mb_4 \ldots mb_9$, $mc_4 \ldots mc_9$, and $md_4 \ldots md_9$ from the time $t_4$ to the time $t_9$ are processed by convolution by a filter while making the filter move a little at a time, whereby the output values from the time $t_7$ to the time $t_9$ ($z_{(1)7}$, $z_{(1)8}$, $z_{(1)9}$) $\ldots$ ($z_{(20)7}$, $z_{(20)8}$, and $z_{(20)9}$) are calculated.

These output values from the time $t_7$ to the time $t_9$ are multiplied with a Sigmoid function or other activation function, and the output values multiplied with the activation function are input to the nodes of the fully connected layer. The outputs from the nodes of the fully connected layer are input to the nodes of the output layer, and an output value showing the temperature of the permanent magnets is output from the node of the output layer. Error backpropagation is used to train the values of the elements of the filters and the weights of the fully connected layer, that is, the weights of the 1D convolutional neural network, so that the difference between this output value and the training data, that is, the actual temperature $Tr_9$ of the permanent magnets at the time $t_9$, becomes smaller. If the 1D convolutional neural network finishes being trained in weights using the output values from the time $t_7$ to the time $t_9$, next, the 1D convolutional neural network is trained in weights using the output values from the time $t_8$ to the time $t_{10}$. In this way, the 1D convolutional neural network is trained in weights until reaching the final time in the list of FIG. 10B.

After the 1D convolutional neural network finishes being trained in weights, the trained 1D convolutional neural network is stored in the RAM 23 of the electronic control unit 20. This trained 1D convolutional neural network is used for processing for estimation of the temperature Tr of the permanent magnets attached to the rotor 7.

Figure 12:
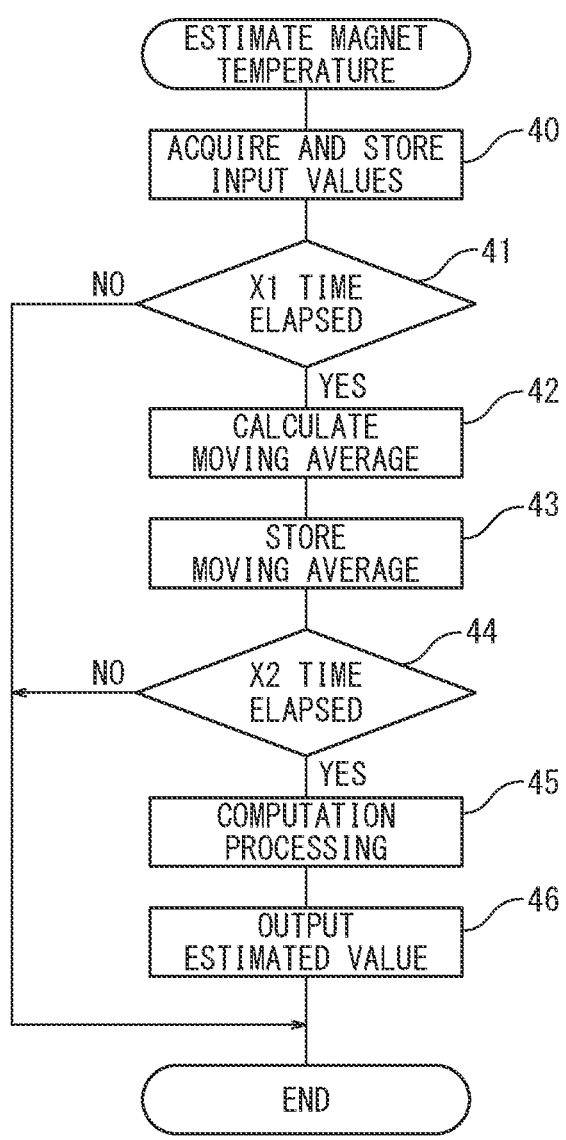
FIG. 12 is a flow chart for estimating the magnet temperature.

FIG. 12 shows the routine for estimation of the magnet temperature performed using this trained 1D convolutional neural network while operating a vehicle. Note that, this routine is executed by interruption every 1 second.

Referring to FIG. 12, first, at step 40, the temperature Ts of the stator coil measured by the temperature sensor 10, the rotational speed Rm of the motor 2 measured by the rotational speed sensor 11, the temperature Ti of the oil measured by the temperature sensor 12, and the rotational speed Rp of the oil pump 3 measured by the rotational speed sensor 13 are acquired and are stored inside the RAM 23. Next, at step 41, it is judged if a fixed time X1 from when the routine for estimation of the magnet temperature has started to be performed has elapsed, that is, the necessary number of measured values required for calculating the moving average has been acquired. If calculating the moving averages based on four measured values, this fixed time X1 is made 4 seconds.

When at step 41 it is judged that the fixed time X1 from when the routine for estimation of the magnet temperature has started to be performed has not elapsed, the processing cycle is ended. As opposed to this, when at step 41 it is judged that the fixed time X1 from when the routine for estimation of the magnet temperature has started to be performed has elapsed, the routine proceeds to step 42 where the moving averages are calculated, then the routine proceeds to step 43 where the calculated moving averages are stored inside the RAM 23. Note that, if using as the moving averages moving averages obtained as simple moving averages (SMA), at step 42, the moving averages shown at the time $t_4$ of FIG. 11A are calculated. Further, the moving averages shown at the time $t_5$ of FIG. 11A are calculated at the next interruption routine after 1 second.

On the other hand, if using as the moving averages moving averages obtained by exponential moving averages (EMA), at step 42, the moving averages shown at the time $t_4$ of FIG. 11B are calculated. Further, the moving averages shown at the time $t_5$ of FIG. 11B are calculated at the next interruption routine after 1 second, then the moving averages similar to the moving averages shown at the time $t_5$ of FIG. 11B are calculated.

Next, at step 44, it is judged if a fixed time X2 from when the routine for estimation of the magnet temperature has started to be performed has elapsed, that is, if it has become a time where estimation of the magnet temperature using the 1D convolutional neural network has become possible. When at step 44 it is judged that the fixed time X2 from when the routine for estimation of the magnet temperature has started has not elapsed, the processing cycle is ended. As opposed to this, when it is judged that the fixed time X2 from when the routine for estimation of the magnet temperature has started to be performed has elapsed, the routine proceeds to step 45 where the trained 1D convolutional neural network is used to perform processing for calculating the estimated value of the magnet temperature. That is, the calculated moving averages are input to the trained 1D convolutional neural network. If the calculated moving averages are input to the trained 1D convolutional neural network, the estimated value of the magnet temperature is output from the trained 1D convolutional neural network (step 46).

Note that, in case where, at the time of training the 1D convolutional neural network in weights, the moving averages $ma_4 \ldots, mb_4 \ldots, mc_4 \ldots, md_4 \ldots$ from the time $t_4$ on at FIG. 10B are processed by convolution by the filter while making the filter move little by little to thereby first calculate the output values $(z_{(1)7}, z_{(1)8}, z_{(1)9}) \ldots (z_{(20)7}, z_{(20)8},$ and $z_{(20)9})$ from the time t7 to the time $t_9$, when estimating the magnet temperature by using the trained 1D convolutional neural network, the moving averages $ma_4 \ldots, mb_4 \ldots, mc_4 \ldots, md_4 \ldots$ from the time $t_4$ on at FIG. 10B are processed by convolution by the filter while making the filter move little by little to thereby also first calculate the output values from the time $t_7$ to the time $t_9$ $(z_{(1)7}, z_{(1)8}, z_{(1)9}) \ldots (z_{(20)7}, z_{(20)8},$ and $z_{(20)9})$. Therefore, in this case, it becomes possible to estimate the magnet temperature at the time $t_9$. Therefore, in this case, the fixed time X2 at step 44 is made 9 seconds. If the processing for estimation of the magnet temperature is started, after that, the estimated value of the magnet temperature is output every 1 second.

Figure 13:
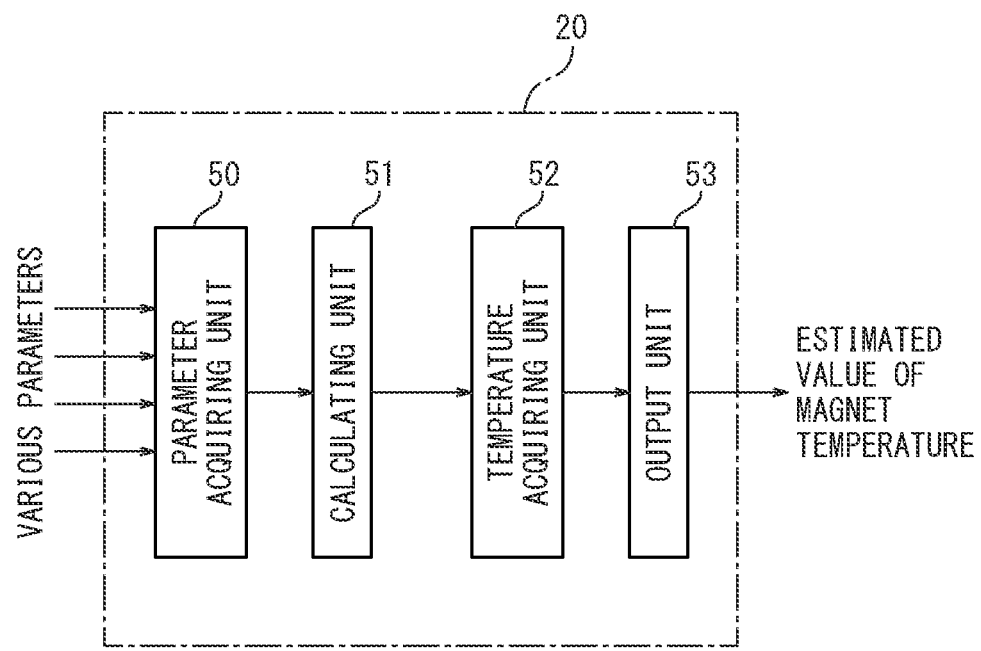
FIG. 13 is a view of a functional constitution of the present invention.

In this way, the magnet temperature estimation device according to the present invention, as shown in the view of the configuration of the invention of FIG. 13, is provide with a parameter acquiring unit 50 for acquiring parameters relating to rotation of the motor 2 concerned, measured every constant time period, a calculating unit 51 for calculating a moving average of every constant interval of these parameters, a temperature acquiring unit 52 for inputting the moving averages calculated by the calculating unit 51 into a training model trained so as to output a temperature of the magnets which the rotor 7 of the motor 2 is provided with when moving averages of the parameters relating to rotation of the motor 2 are input and acquiring the estimated value of the magnet temperature output from the training model, and an output unit 53 for outputting the estimated value of the magnet temperature which the temperature acquiring part 52 acquires.

In this case, in the embodiment of the present invention, the above-mentioned training model is comprised of the 1D convolutional neural network. Further, in the embodiment of the present invention, the parameters relating to rotation of the motor 2 include the stator coil temperature Ts, the motor rotational speed Rm, the oil temperature Ti, and the oil pump rotational speed Rp. Further, in the embodiment of the present invention, as the moving averages, moving averages obtained by exponential moving averages (EMA) can be used. In this case, the calculating unit 51 calculates exponential moving averages as the moving averages.

Further, it is learned that the temperature of the permanent magnets attached to the rotor 7 is correlated with the torque of the motor 2, the motor current flowing through the stator coil of the motor 2, and the inverter frequency related to the rotational speed of the motor 2 and that the changes along with time of these torque of the motor 2, motor current, and inverter frequency from the past to the present also affect the temperature of the permanent magnets attached to the rotor 7. Therefore, the parameters relating to rotation of the motor 2 can be made to include, in addition to the stator coil temperature Ts, the motor rotational speed Rm, the oil temperature Ti, and the oil pump rotational speed Rp, the motor torque, the motor current, and the inverter frequency.

Figure 14:
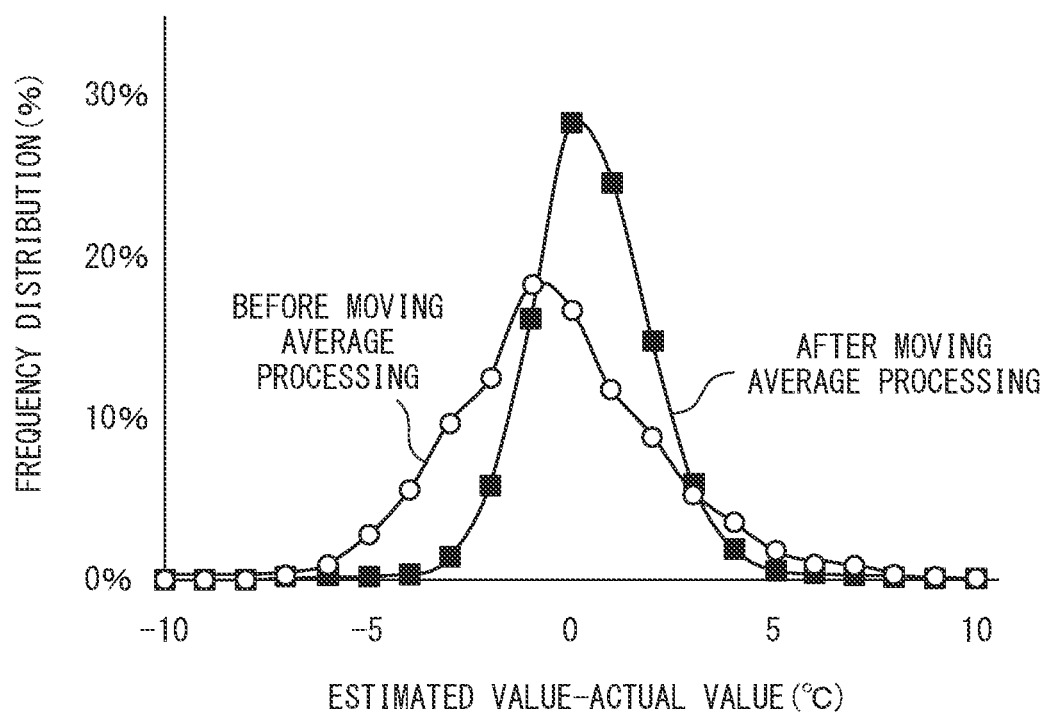
FIG. 14 is a view showing a relationship between an estimation error of the magnet temperature and frequency distribution.

FIG. 14 shows the relationship between the estimation error (estimated value-actual value) of the magnet temperature and the frequency distribution when making the operating state of the vehicle randomly change while operating the vehicle. From FIG. 14, it is understood that when performing the moving average processing for the measured values (after performing moving average), the estimation error of the magnet temperature becomes smaller compared with when not processing the moving average processing for the measured values (before performing moving average) as shown in FIG. 3 to FIG. 4B.

Figure 15:
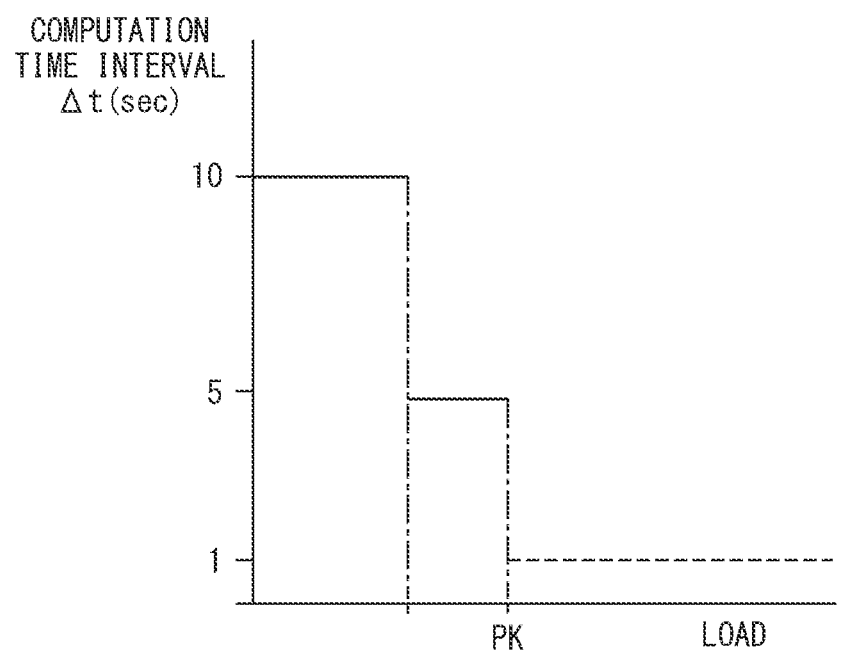
FIG. 15 is a view showing a relationship between a computation time interval and a drive load of a vehicle.
Figure 16:
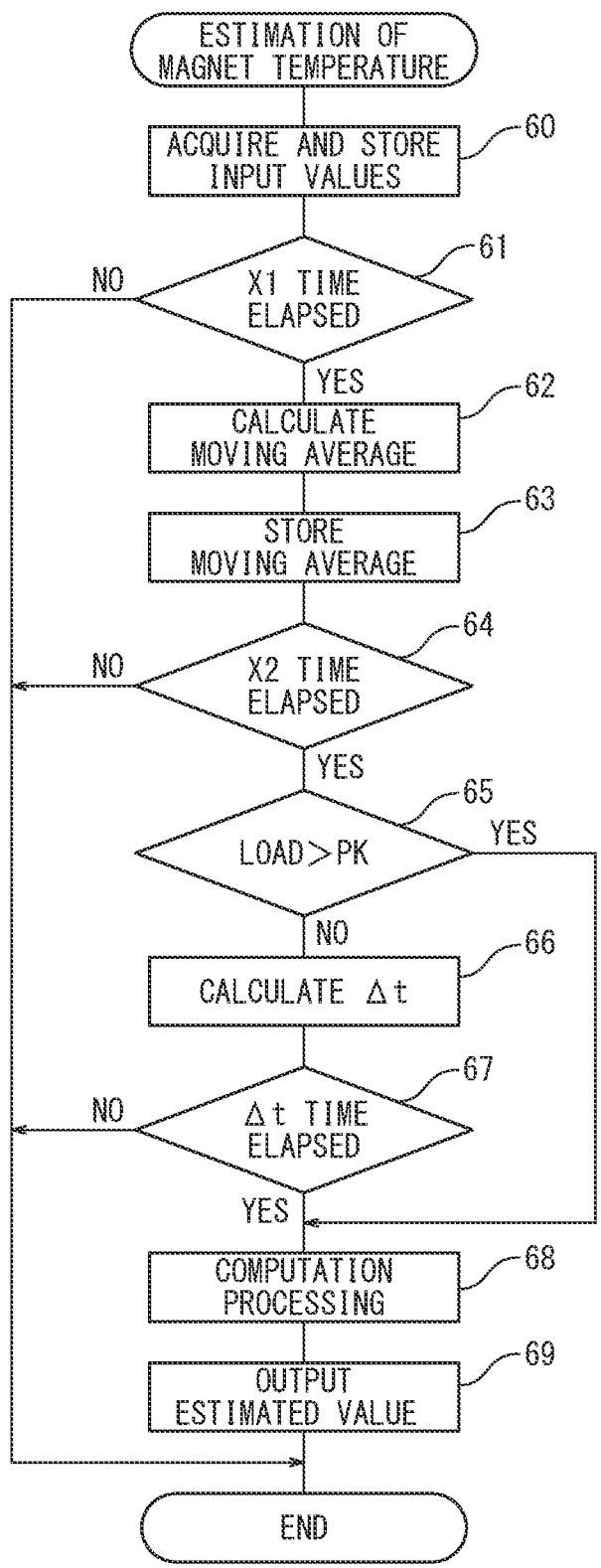
FIG. 16 is a flow chart for estimating the magnet temperature.

Now then, in the routine for estimation of the magnet temperature shown in FIG. 12, as explained above, if the processing for estimation of the magnet temperature is started, after that, the processing for computation of the estimated value of the magnet temperature is performed every 1 second and the estimated value of the magnet temperature is output every 1 second. In this regard, however, when the drive load of the vehicle is small, the speed of change of the magnet temperature becomes slow and the necessity of acquiring the estimated value of the magnet temperature at short intervals falls. Therefore, when the drive load of the vehicle is small, to reduce the consumed electric power, it is preferable to lower the frequency of processing for computation of the estimated value of the magnet temperature. FIG. 15 and FIG. 16 show another embodiment designed to lower the frequency of processing for computation of the estimated value of the magnet temperature when the drive load of the vehicle is small.

In this other embodiment, as shown in FIG. 15, if the drive load of the vehicle becomes smaller than a set load PK, the computation time interval Δt of the estimated value of the magnet temperature is made larger. In this case, in the example shown in FIG. 15, if the drive load of the vehicle becomes smaller than the set load PK, the computation time interval Δt of the estimated value of the magnet temperature is made larger and if the drive load of the vehicle becomes further smaller, the computation time interval Δt of the estimated value of the magnet temperature is made further larger. Specifically speaking, when the drive load of the vehicle is larger than the set load PK, the computation time interval Δt of the estimated value of the magnet temperature is made 1 second, when the drive load of the vehicle becomes smaller than the set load PK, the computation time interval Δt of the estimated value of the magnet temperature is made 5 seconds, and if the drive load of the vehicle becomes further smaller, the computation time interval Δt of the estimated value of the magnet temperature is made 10 seconds.

FIG. 16 shows the routine for estimation of the magnet temperature for working this other embodiment. Note that, this routine is also executed by interruption every 1 second. Further, step 60 to step 64 of the routine for estimation of the magnet temperature shown in FIG. 16 are the same as step 40 to step 44 of the routine for estimation of the magnet temperature shown in FIG. 12.

That is, referring to FIG. 16, first, at step 60, the temperature Ts of the stator coil measured by the temperature sensor 10, the rotational speed Rm of the motor 2 measured by the rotational speed sensor 11, the temperature Ti of the oil measured by the temperature sensor 12, and the rotational speed Rp of the oil pump 3 measured by the rotational speed sensor 13 are acquired and stored inside the RAM 23. Next, at step 61, it is judged if the fixed time X1 from when the routine for estimation of the magnet temperature has started to be performed, for example, 4 seconds, has elapsed.

When at step 61 it is judged that the fixed time X1 from when the routine for estimation of the magnet temperature has started to be performed has not elapsed, the processing cycle is ended. As opposed to this, when at step 61 it is judged that the fixed time X1 from when the routine for estimation of the magnet temperature has started to be performed has elapsed, the routine proceeds to step 62 where the moving averages are calculated, then the routine proceeds to step 63 where the calculated moving averages are stored inside the RAM 23. Note that, if using as the moving averages moving averages obtained by simple moving averages (SMA), at step 62, the moving averages shown at the time $t_4$ of FIG. 11A are calculated and the moving averages shown at the time $t_5$ of FIG. 11A are calculated at the next interruption routine after 1 second. On the other hand, if using as the moving averages moving averages obtained by exponential moving averages (EMA), at step 62, the moving averages shown at the time $t_4$ of FIG. 11B are calculated and the moving averages shown at the time $t_5$ of FIG. 11B are calculated at the next interruption routine after 1 second.

Next, at step 64, it is judged if the fixed time X2 from when the routine for estimation of the magnet temperature has started to be performed, for example, 9 seconds, has elapsed. When at step 64 it is judged that the fixed time X2 from when the routine for estimation of the magnet temperature has started has not elapsed, the processing cycle is ended. As opposed to this, when it is judged that the fixed time X2 from when the routine for estimation of the magnet temperature has started to be performed has elapsed, the routine proceeds to step 65 where it is judged if the drive load of the vehicle is larger than the set load PK. When it is judged that the drive load of the vehicle is larger than the set load PK, the routine jumps to step 68 where processing for computation of the estimated value of the magnet temperature is performed using the trained 1D convolutional neural network. That is, the calculated moving averages are input to the trained 1D convolutional neural network. If the calculated moving averages are input to the trained 1D convolutional neural network, the estimated value of the magnet temperature is output from the trained 1D convolutional neural network (step 69). At this time, in the same way as when the routine for estimation of the magnet temperature shown in FIG. 12 is performed, if the processing for estimation of the magnet temperature is started, the estimated value of the magnet temperature is output every 1 second.

On the other hand, when at step 65 it is judged that the drive load of the vehicle is not larger than the set load PK, the routine proceeds to step 66 where the computation time interval Δt of the estimated value of the magnet temperature corresponding to the drive load of the vehicle is calculated from the relation shown in FIG. 15. Next, at step 67, it is judged if the computation time interval Δt of the estimated value of the magnet temperature has elapsed. When at step 67 it is judged that the computation time interval Δt of the estimated value of the magnet temperature has not elapsed, the processing cycle is ended. As opposed to this, when at step 67 it is judged that the computation time interval Δt of the estimated value of the magnet temperature has elapsed, the routine proceeds to step 68 where processing for computation of the estimated value of the magnet temperature is performed using the trained 1D convolutional neural network. Therefore, at this time, the processing for computation of the estimated value of the magnet temperature is performed by the computation time interval Δt corresponding to the drive load of the vehicle, for example, every 5 seconds or every 10 seconds, and the estimated value of the magnet temperature is output for example, every 5 seconds or every 10 seconds.

That is, in this other embodiment, the interval of acquisition of the estimated value of the magnet temperature by the temperature acquiring unit 52 (FIG. 13) is made to change in accordance with the drive load of the vehicle, and the interval of acquisition of the estimated value of the magnet temperature when the drive load of the vehicle is low is made longer than the interval of acquisition of the estimated value of the magnet temperature when the drive load of the vehicle is high.

Figure 17A:
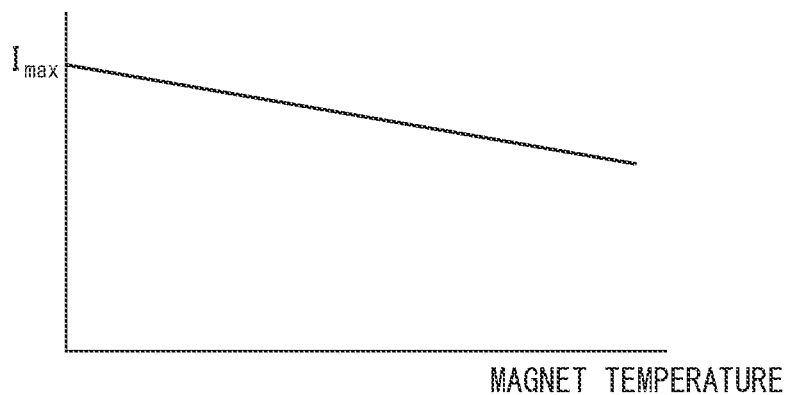
FIG. 17A and FIG. 17B are respectively views showing a relationship between the magnet temperature and a drive current upper limit and a flow chart for control of the drive current.
Figure 17B:
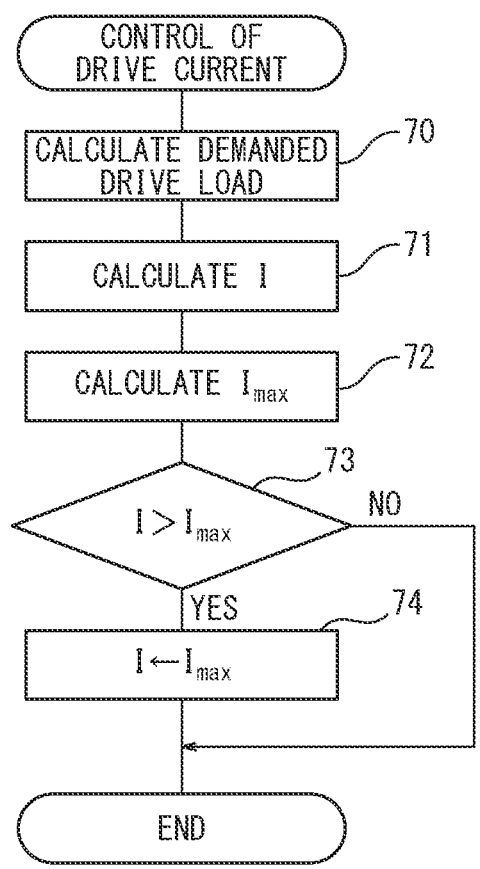

FIG. 17A and FIG. 17B show control of the drive current of the motor 2 performed using the estimated value of the magnet temperature. In this control of the drive current of the motor 2, as shown in FIG. 17A, the higher the magnet temperature, the more the maximum value I max of the drive current of the motor 2 is made to fall. FIG. 17B shows the routine for control of the drive current of the motor 2 performed inside the electronic control unit 20 during operation of the vehicle. Note that, this routine is executed by interruption every fixed time period. Referring to FIG. 17B, first, at step 70, the demanded drive load of the vehicle is calculated. Next, at step 71, the drive current I of the motor 2 is calculated based on the demanded drive load of the vehicle. Next, at step 72, the maximum value I max of the drive current of the motor 2 is calculated from the relation shown in FIG. 17A based on the estimated value of the magnet temperature. Next, at step 73, it is judged if the calculated drive current I of the motor 2 is larger than the maximum value I max. When the calculated drive current I of the motor 2 is larger than the maximum value I max, the routine proceeds to step 74 where the drive current I of the motor 2 is made the maximum value I max.

Figure 18A:
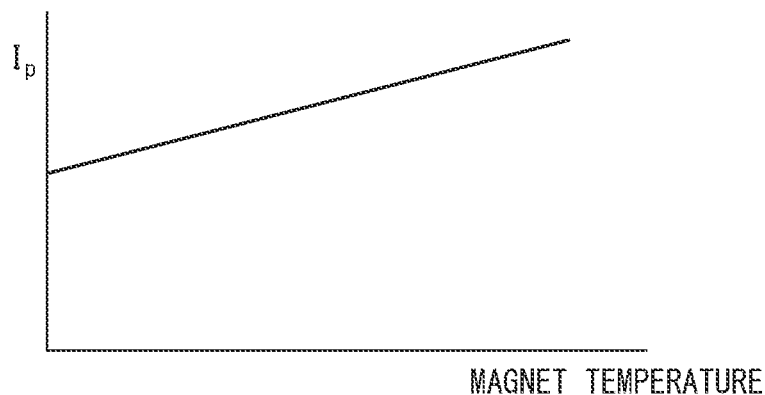
FIG. 18A and FIG. 18B are respectively views showing a relationship between the magnet temperature and a drive current of an oil pump-drive motor and a flow chart for control of the drive operation of the oil pump.
Figure 18B:
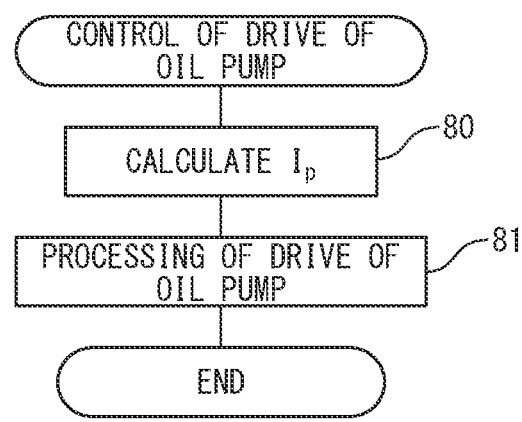

FIG. 18A and FIG. 18B show the control for drive operation of the oil pump 3 performed using the estimated value of the magnet temperature. In this case, as the oil pump 3, an oil pump driven by an oil pump drive-use motor is used. As shown in FIG. 18A, the higher the magnet temperature, the more the drive current I p of the oil pump drive-use motor is made to increase. If the drive current I p of the oil pump drive-use motor is made to increase, the cooling action of the oil in the oil cooler 4 will be enhanced, so the oil will fall in temperature and the magnet temperature will be made to fall. FIG. 18B shows the routine for controlling the drive of the oil pump 2 performed in the electronic control unit 20 while the vehicle is being operated. Note that, this routine is executed by interruption every fixed time period. Referring to FIG. 18B, first, at step 80, the drive current I p of the oil pump drive-use motor is calculated from the relation shown in FIG. 18A based on the estimated value of the magnet temperature. Next, at step 81, the drive of the oil pump 3 is controlled so that the drive current of the oil pump drive-use motor becomes the calculated drive current I p.

The invention claimed is:

1. A magnet temperature estimation device comprising a parameter acquiring unit for acquiring parameters relating to rotation of a motor concerned, measured every constant time period, a calculating unit for calculating a moving average of every constant interval of the parameters, a temperature acquiring unit for inputting the moving averages calculated by the calculating unit into a training model trained so as to output a temperature of magnets attached to a rotor of the motor when the moving averages of the parameters relating to rotation of the motor are input to acquire an estimated value of the magnet temperature output from the training model, and an output unit for outputting the estimated value of the magnet temperature which the temperature acquiring unit acquires, wherein the parameters include a stator coil temperature, motor rotational speed, oil temperature, and oil pump rotational speed.

2. The magnet temperature estimation device according to claim 1, wherein the training model is a 1D convolutional neural network.

3. The magnet temperature estimation device according to claim 1, wherein the parameters include, in addition to the stator coil temperature, motor rotational speed, oil temperature, and oil pump rotational speed, a motor torque, motor current, and inverter frequency.

4. The magnet temperature estimation device according to claim 1, wherein the calculating unit calculates an exponential moving average as the moving average.

5. A magnet temperature estimation device comprising a parameter acquiring unit for acquiring parameters relating to rotation of a motor concerned, measured every constant time period, a calculating unit for calculating a moving average of every constant interval of the parameters, a temperature acquiring unit for inputting the moving averages calculated by the calculating unit into a training model trained so as to output a temperature of magnets attached to a rotor of the motor when the moving averages of the parameters relating to rotation of the motor are input to acquire an estimated value of the magnet temperature output from the training model, and an output unit for outputting the estimated value of the magnet temperature which the temperature acquiring unit acquires, wherein an interval of acquisition of the estimated value of the magnet temperature by the temperature acquiring unit is made to change in accordance with a drive load of a vehicle, and the interval of acquisition of the estimated value of the magnet temperature when the drive load of the vehicle is low is made longer than the interval of acquisition of the estimated value of the magnet temperature when the drive load of the vehicle is high.

* * * * *